United States Patent
Svendsen et al.

(10) Patent No.: US 7,131,501 B1
(45) Date of Patent: Nov. 7, 2006

(54) DISK HARROW WITH U-SHAPED CUSHIONS OF TAPERED ROUND SECTION

(75) Inventors: Melvin Svendsen, Calgary (CA); Donald Stoesz, Langdon (CA); Simon Fen, Calgary (CA); Luc Jarry, Calgary (CA); Marty Boll, Calgary (CA)

(73) Assignee: Standens Ltd., Calgary (CA)

( * ) Notice: Subject to any disclaimer, the term of this patent is extended or adjusted under 35 U.S.C. 154(b) by 0 days.

(21) Appl. No.: 11/205,317

(22) Filed: Aug. 17, 2005

(51) Int. Cl.
*A01B 15/16* (2006.01)
*A01B 21/00* (2006.01)
*A01B 23/06* (2006.01)
*A01B 35/16* (2006.01)
*A01B 35/28* (2006.01)

(52) U.S. Cl. .................. 172/601; 172/762; 172/763
(58) Field of Classification Search ........ 172/599–604, 172/681, 762, 763
See application file for complete search history.

(56) References Cited

U.S. PATENT DOCUMENTS

| | | |
|---|---|---|
| 4,066,132 A | 1/1978 | Rehn |
| 4,407,372 A | 10/1983 | Rozeboom |

*Primary Examiner*—Christopher J. Novosad
(74) *Attorney, Agent, or Firm*—Adrian D. Battison; Michael R. Williams; Ryan W. Dupuis

(57) ABSTRACT

U-shaped cushions, also known as shanks or spring members, resiliently support a gang of disks on the frame of a disk harrow. The agricultural disk cushion is manufactured from a round section of raw material which is lighter and more resistant to torsion related failure than traditional rectangular section shanks. Two leg portions are each tapered to have flat surfaces on opposite sides for flush fitting with mounting elements, while a central portion connecting them remains circular in cross section. The round cross section in this critical area can withstand severe omni-directional loading, as its resistance is equal in all directions The spring rate the leg portions of the disk cushion can be tailored individually to meet the requirements of the application.

20 Claims, 3 Drawing Sheets

DISK HARROW WITH U-SHAPED CUSHIONS OF TAPERED ROUND SECTION

This invention relates generally to agricultural implements, and more particularly to a structure for resiliently supporting a gang of earth working tools on the frame of an agricultural implement.

BACKGROUND OF THE INVENTION

Disk gangs of harrows are often resiliently supported on the harrow frame so that each gang can independently yield to obstructions met by the disks in the farmland being harrowed. This reduces the impact forces transmitted to the frame and the potential damage to the disk gang caused by engagement with obstructions such as rocks, stumps or roots.

Existing resilient mounting arrangements often include U-shaped spring members mounted between a cross member on the frame and the shaft on which the disks are mounted. These U-shanks or disk cushions are typically manufactured from square or rectangular cross-section material, formed to shape and heat-treated. U.S. Pat. Nos. 4,066,132 and 4,407,372 disclose U-shaped spring members having rectangular cross sections. In some cases these disk cushions may have one or two tapered legs, where the thickness of the leg is variable along its length. This is done to provide exactly the right spring rate to meet the application requirements.

Disk cushions undergo loading in many planes, often resulting in a torsional load being applied to the part, concentrated at the central portion of the U-shaped member between the leg portions. This applied torsion tends to be a repeated and cyclic load that often leads to failure of the part. The square shape of the part is not the optimum shape to resist this form of torsional fatigue. Therefore, there is a desire for a cushion with an improved resistance to torsional loads applied during use of the disk harrow.

SUMMARY OF THE INVENTION

According to an aspect of the invention there is provided a disk harrow comprising:

a frame adapted for motion along a ground surface;

an upper cross member supported generally horizontally on the frame;

a lower cross member supported below the first cross member and extending generally parallel to said first cross member;

U-shaped spring members resiliently supporting the lower cross member on the upper cross member, said spring members being spaced apart along said cross members, each U-shaped spring member comprising a curved central portion extending between parallel first and second leg portions;

upper mounting elements each connecting the first leg portion of a respective one of the spring members to the upper cross member;

lower mounting elements each connecting the second leg portion of a respective one of the spring members to the lower cross member; and a plurality of disk members supported on and spaced along the lower cross member, each disk member being arranged to engage the ground surface;

the central portion of each U-shaped spring member having a circular cross section;

the first leg portion of each U-shaped spring member having a first generally flat surface facing the second leg portion of said U-shaped spring member and a second generally flat surface opposite said first generally flat surface;

the second leg portion of each U-shaped spring member having a first generally flat surface facing the first leg portion of said U-shaped spring member and a second generally flat surface opposite said first generally flat surface; and the U-shaped spring members being arranged such that the central portions of each spring member extend generally vertically and are disposed forward of the upper and lower cross members and the first and second leg portions of said spring member extend generally horizontally rearward from said central portion.

Preferably the first and second generally flat surfaces of each leg portion of each spring member are spaced apart by a respective distance, said respective distance being less than a diameter of the circular cross section of the central portion of said spring member.

The U-shaped spring member, or disk cushion, is created from a round section of raw material. The raw material is sheared to length and each end is hot rolled to the required tapered thickness in order to achieve the proper spring rate. The part is then heat-treated, formed and receives a final surface preparation. With a diameter equal to the thickness of a typical cushion having a rectangular cross section, the round cross section of the central portion of the U-shaped spring member provides the same torsional resistance using less material, resulting in a lighter product. Aside from being lighter and stronger, these cushions are also easily customized to achieve a unique spring rate for specific applications.

Preferably the U-shaped spring members are arranged such that the first and second leg portions of each spring member extend generally perpendicular to the upper and lower cross members.

Preferably each upper mounting element comprises a first mounting member disposed above the upper cross member and a second mounting member disposed below said upper cross member, said first and second mounting members being attached so as to clamp said upper cross member therebetween.

Preferably there are provided pairs of aligned holes in the first and second mounting members of each upper mounting element for attachment of said mounting members by bolting.

Preferably the pairs of aligned holes in the first and second mounting members of each upper mounting element are disposed on opposite sides of the upper cross member.

Preferably there is provided at least one hole in the first leg portion of each U-shaped spring member, at least one of the pairs of aligned holes in the first and second mounting members of each upper mounting element aligning with the at least one hole in the first leg portion of the respective spring member for attachment of said upper mounting element and said respective spring member by bolting.

Preferably the first mounting member of each upper mounting element comprises a generally flat plate.

Preferably the second mounting member of each upper mounting element comprises a block having at least one recessed portion arranged to receive a portion of at least one of the upper cross member and the first leg portion of the respective spring member.

Preferably each lower mounting element comprises a first mounting member supported on the lower cross member and a second mounting member disposed above said first mounting member, said first and second mounting members of the lower mounting element being attached so as to clamp the second leg portion of the respective spring member therebetween.

Preferably the first mounting member of each lower mounting element is supported above the lower cross member such that the second leg portion of the respective spring member is immediately adjacent each of the first and second mounting members of said lower mounting element above said lower cross member.

Preferably the second mounting member of each lower mounting element comprises a generally flat plate.

Preferably the first mounting member of each lower mounting element comprises an angled member having a generally vertical portion extending upward from the lower cross member and a generally horizontal portion supported on said generally vertical portion upward of said lower cross member, the second leg portion of the respective spring member being clamped between said generally horizontal portion of said first mounting member and the second mounting member of said lower mounting element.

Preferably there are provided pairs of aligned holes in the first and second mounting members of each lower mounting element for attachment of said mounting members by bolting.

Preferably the pairs of aligned holes in the first and second mounting members of each lower mounting element are disposed on opposite sides of the lower cross member.

Preferably there is provided at least one hole in the second leg portion of each U-shaped spring member, at least one of the pairs of aligned holes in the first and second mounting members of each lower mounting element aligning with the at least one hole in the second leg portion of the respective spring member for attachment of said lower mounting element and said respective spring member by bolting.

Preferably the lower cross member comprises a shaft adapted for rotation about an axis thereof, said shaft being supported by the lower mounting elements connected to the second leg portions of the spring members, the disk members being mounted on said shaft for rotation therewith.

Preferably the lower cross member further comprises at least one hollow housing member extending between adjacent disk members, the shaft being supported for rotation within said at least one housing member, said at least one housing member having the lower mounting elements attached thereto.

According to a second aspect of the invention there is provided a disk harrow comprising:
 a frame adapted for motion along a ground surface;
 an upper cross member supported generally horizontally on the frame;
 a shaft supported below the first cross member, said shaft adapted for rotation about a longitudinal axis thereof and extending generally parallel to said first cross member;
 a plurality of disk members supported on and spaced along the shaft, each disk member being arranged to engage the ground surface and rotate with said shaft;
 U-shaped spring members resiliently supporting the shaft on the upper cross member, said spring members being spaced apart along said cross members, each U-shaped spring member comprising a curved central portion extending between parallel first and second leg portions;
 upper mounting elements each connecting the first leg portion of a respective one of the spring members to the upper cross member; and
 lower mounting elements each connecting the second leg portion of a respective one of the spring members to the shaft;
 the central portion of each U-shaped spring member having a circular cross section;
 the first leg portion of each U-shaped spring member having a first generally flat surface facing the second leg portion of said U-shaped spring member and a second generally flat surface opposite said first generally flat surface;
 the second leg portion of each U-shaped spring member having a first generally flat surface facing the first leg portion of said U-shaped spring member and a second generally flat surface opposite said first generally flat surface; and
 the U-shaped spring members being arranged such that the central portions of each spring member extend generally vertically and are disposed forward of the upper and lower cross members and the first and second leg portions of said spring member extend generally horizontally rearward from said central portion.

Preferably the first and second generally flat surfaces of each leg portion of each spring member are spaced apart by a distance, said distance being less than a diameter of the circular cross section of the central portion of said spring member.

BRIEF DESCRIPTION OF THE DRAWINGS

In the accompanying drawings, which illustrate exemplary embodiments of the present invention.

DETAILED DESCRIPTION

Figure 1:
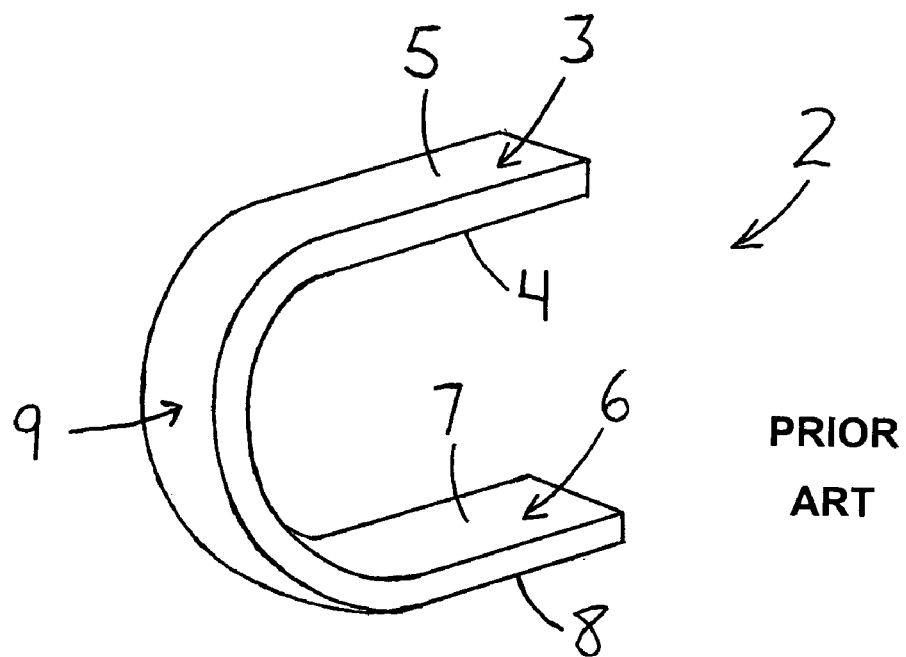
FIG. 1 is an isometric view of a U-shaped spring member having a rectangular cross section as described in prior art.

FIG. 1 illustrates a typical U-shaped spring member, or disk cushion, described in prior art for use as a resilient supporting member in a disk harrow. The disk cushion 2 features a first leg portion 3 having a first flat surface 4 and a second flat surface 5. Similarly, a second leg portion 6 has a first flat surface 7 and a second flat surface 8. These flat surfaces are defined by the rectangular cross section of the cushion. The two leg portions 3 and 6 are connected at one end by a curved central portion 9.

Figure 2:
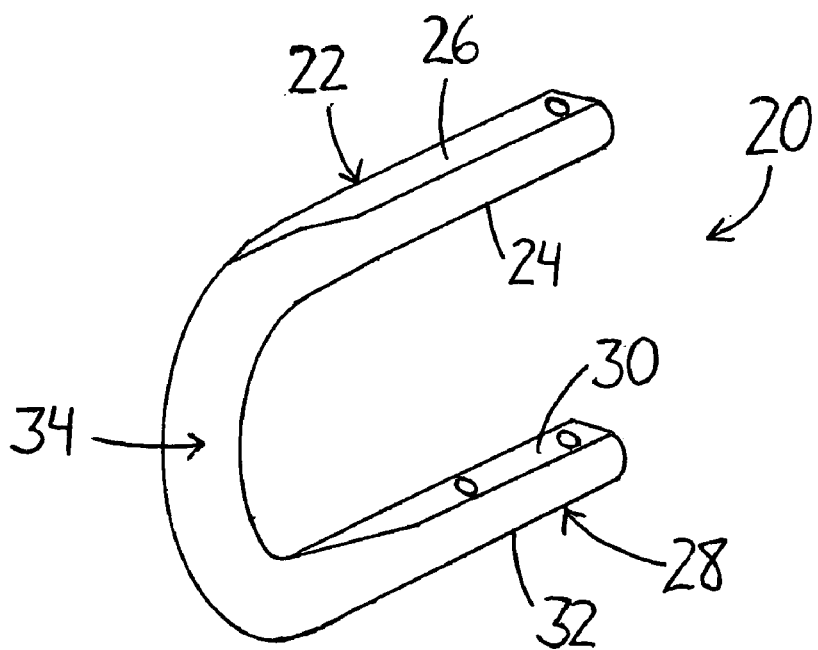
FIG. 2 is an isometric view of a U-shaped spring member according to the present invention.

FIG. 2 illustrates a disk cushion 20 according to the present invention. Similar to the prior art in the arrangement of it components, the disk cushion 20 features a first leg portion 22 having a first flat surface 24 and a second flat surface 26, a second leg portion 28 having a first flat surface 30 and a second flat surface 32 and a curved central portion 9 connecting the two leg portions 22 and 28 at one end. The two leg portions 22 and 28 are parallel and extend in the same direction from the central portion 9, thereby defining the U-shape of the cushion 20. The first flat surfaces 24 and 30 of the two leg portions 22 and 28 face each other inside the U-shape. The second flat surfaces 26 and 32 are each opposite their respective first surfaces 24 and 30, such that the second surface 26 of the first leg portion 22 faces away from the second leg portion 28 and the second surface 32 of the second leg portion 28 faces away from the first leg portion 22.

Figure 3:
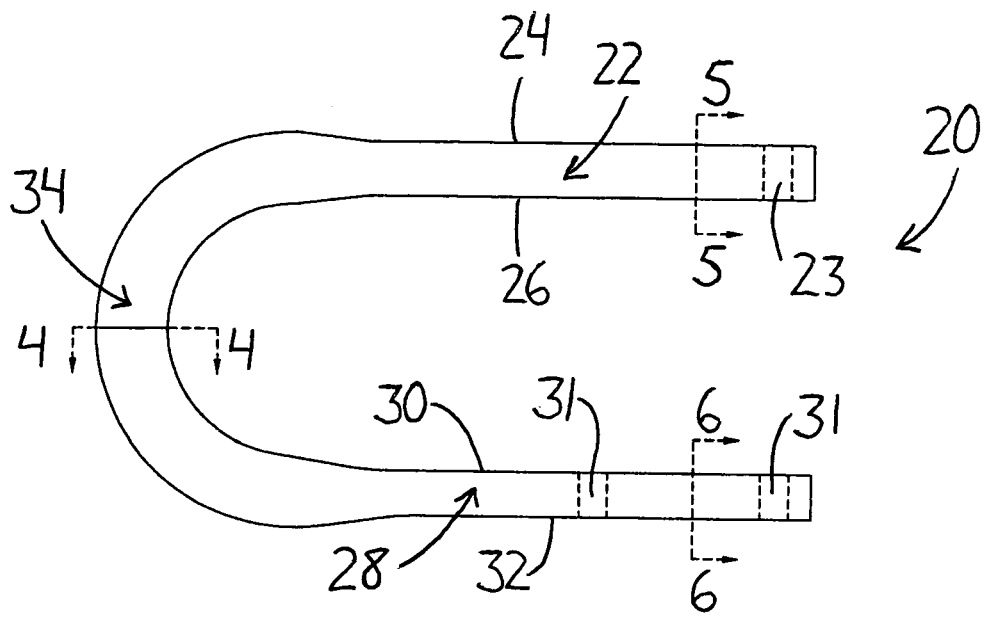
FIG. 3 is a side view of the U-shaped spring member according to the present invention.
Figure 4:
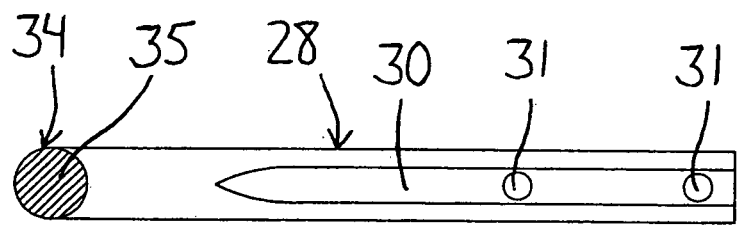
FIG. 4 is a cross sectional view of the U-shaped spring member according to the present invention as taken from line 4–4 of FIG. 3.
Figure 5:
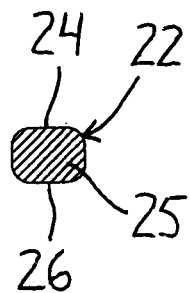
FIG. 5 is a cross sectional view of the U-shaped spring member according to the present invention as taken from line 5–5 of FIG. 3.
Figure 6:
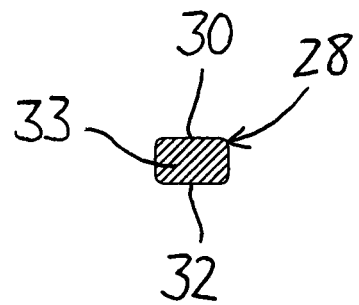
FIG. 6 is a cross sectional view of the U-shaped spring member according to the present invention as taken from line 6—6 of FIG. 3.

The disk cushion 20 is manufactured from round bar stock which results in the round cross section of the central portion 34. The diameter of the round bar stock is selected based upon the application of the part, specifically the required strength and required spring rate. In the prior art shown in FIG. 1, the flat surfaces 4, 5, 7 and 8 were automatically provided by the rectangular cross section of the disk cushion 2. Since the disk cushion 20 of the present invention is made from a round section, the flat surfaces must be produced during the manufacturing process. Each of the legs 22 and 28 of the disk cushion 20 is tapered in a hot roll machine to the desired finished thickness, resulting in the tapered shape best shown in FIG. 3. The part is then heat-treated, formed and receives a final surface preparation. As can be seen, the leg portions 22 and 28 have a resulting thickness that is less than the diameter of the cross section of the central portion 34, which remains circular (as shown in FIG. 4). As shown by the cross sections 25 and 33 of the first and second leg portions 22 and 28 respectively in FIGS. 5 and 6, the leg portions 22 and 28 can have different thicknesses chosen based on the spring rate required by the specific application of the final product.

Figure 7:
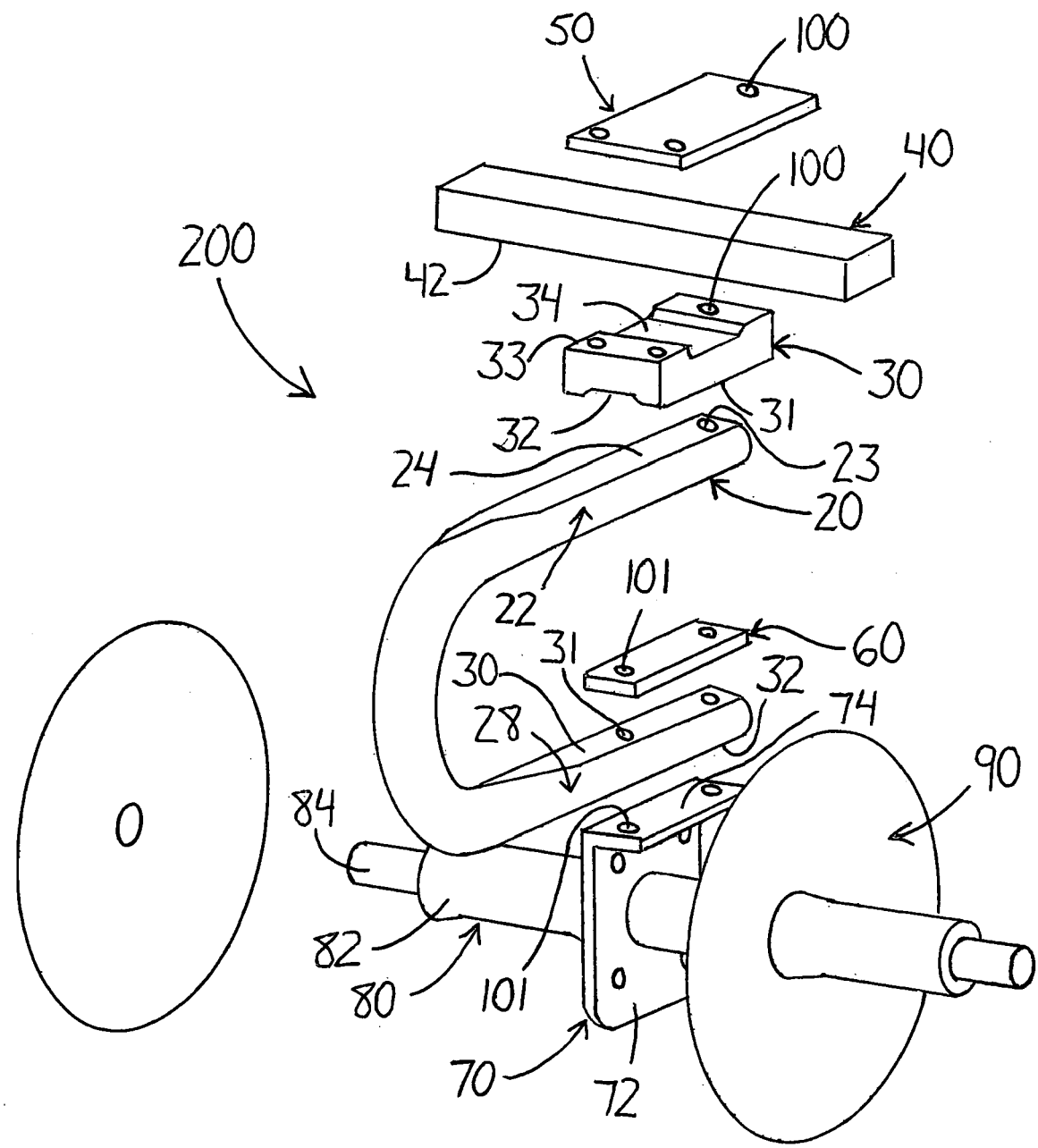
FIG. 7 is an exploded isometric view of a single support assembly of a disk harrow according to the present invention.

FIG. 7 illustrates the arrangement of a single support assembly for a disk harrow featuring the disk cushion 20 as the resilient supporting means. A frame adapted for motion along the ground by means well known to those of skill in the art includes an upper cross member 40 from which a gang of disks 90 is resiliently suspended by disk cushions 20. The drawing shows a single support assembly 200 disposed between an adjacent pair of disks 90. Two or more support assemblies 200 featuring the cushion 20 are provided spaced along the upper cross member 40 depending on the length of the gang of disks. An upper mounting element consisting of a first mounting member 50 and a second mounting member 30 supports the disk cushion 20 on the upper cross member 40 by means of the first leg portion 22. At the second leg portion 28 of the disk cushion 20, a lower mounting element consisting of a first mounting member 70 and a second mounting member 60 for connecting the disk cushion 20 to a lower cross member 80. The lower cross member 80 consists of a hollow housing member 82 having a rotatable shaft 84 supported within. The disks 90 are mounted on the shaft 84 for rotation with the shaft. The housing 82 serves to provide a means of connecting the shaft 84 and the lower mounting element without transferring the rotational motion of the shaft 84 to the mounting element and connected disk cushion 20. Means of mounting a rotating shaft within a non-rotating housing are well known to those of skill in the art.

As seen in FIG. 7, the purpose of the flat surfaces of each leg portion of the disk cushion is to provide suitable surfaces for flush mounting against other components of the disk harrow. The second mounting member 30 of the upper mounting element is a block featuring recesses 32 and 34 in its lower surface 31 and upper surface 33 respectively. The lower recess 32 is shaped to receive a portion of the second flat surface 24 of the first leg portion 22 of the cushion 20 such that the two parts fit flush together. Similarly, the upper recess 34 receives the lower surface 42 of the upper cross member 40 in a flush engagement.

The first mounting member 50 of the upper mounting element is a flat plate that is placed atop the upper cross member 40, which as described above, is received within the upper recess 34 of the second mounting member 30. Holes 100 are provided in the first and second mounting members 50 and 30 of the upper mounting element, the holes in the first mounting member 50 being axially aligned with those in the second mounting member 30. The holes 100 of each mounting member of the upper mounting element are arranged two on a first side of the upper cross member 40 nearest the central portion 34 of the cushion 20 and one on a second side opposite the first side. The holes on the first side of the upper cross member 40 allow the attachment of the mounting members 30 and 50 by bolting means known to those of skill in the art. A mounting hole 23 provided in the first leg portion 22 of the disk cushion 20 is axially aligned with the holes 100 on the second side of the upper cross member 40 such that the first mounting element 50, second mounting element 30 and cushion 20 can all be attached by means of bolting. This results in a layered arrangement consisting of, from top to bottom, the first mounting element 50, the upper cross member 40, the second mounting element 30 and the disk cushion 20.

The first mounting member 70 of the lower mounting element consists of a right angle plate member having a vertical portion 72 supported on the housing member 82 and a horizontal portion 74 supported on the vertical portion 72. The vertical portion 72 extends upward from the lower cross member 80 to support the horizontal portion 74 above it. The second leg portion 28 is supported upon the first mounting member 70 such that the second flat surface 32 sits flush on the horizontal portion 74. The second mounting member 60 of the lower mounting element is a flat plate 60 that is disposed above the second leg portion 28 of the cushion 20 so as to sit flush on the first flat surface 30. Axially aligned holes 101 are provided in the two mounting members 60 and 70 of the lower mounting element. Mounting holes 31 in the second leg portion 28 of the cushion 20 are axially aligned with the holes 101 in the mounting members 70 and 60 such that the three components can be attached by means of bolting. This arrangement results in the clamping of the second leg portion 28 between the first 70 and second 60 mounting members of the lower mounting element.

When the disks 90 engage the soil during harrowing, loads are imparted onto the disk cushion 20. These loads result from the weight of the disks 90 and lower cross member 80, the force required to pull the disks through the soil, impact between the disks and rocks or other obstructions and forces exerted on the disks during cornering of the harrow. These multiple loads act in a variety of planes, resulting in an offset or torsional load being applied to the central portion 34 of the disk cushion 20. Sharp corners, like those found in the square or rectangular cross sections of prior art cushions 2, act as stress risers to this type of torsional loading. Stress risers lead to premature failure of the component in areas of close proximity. The round cross section 35 of the central section of the disk cushion 20 of the present invention, as seen in FIG. 4, does not have corners and therefore is not weakened by the presence of stress risers. As a result, the cushion 20 as described above is better suited to deal with these torsional loads and thus has a greater fatigue life.

The cushion 20 according to the present invention is lighter than a cushion made from square or rectangular cross sectional material designed to have similar properties. When used for this application, square or rectangular stock has essentially unused or wasted material in the corners that does little to add to the strength of the final product. Selecting the proper diameter of material sets the spring rate of the disk cushion. A round section with a diameter equivalent to the thickness of a rectangular section provides similar strength with less material. With the elimination of the wasted corner material the part will be significantly lighter. This reduces the overall weight of the disk harrow, thereby reducing the amount of power needed to move the implement over the ground.

The above discussion describes a single embodiment of the present invention. It should be noted that the disk cushion 20 having a central portion 34 of circular cross section can be used to resiliently support gangs of disks in disk harrows having different mounting arrangements. The rotating shaft can be supported by means other than the longitudinal cylindrical housing shown. Similarly, alternate mounting elements and methods of attaching the various components of a disk harrow are well known to those of skill in the art.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A disk harrow comprising:
   a frame adapted for motion along a ground surface, said frame comprising an upper cross member supported generally horizontally;
   a lower cross member supported below the first cross member and extending generally parallel to said first cross member;
   U-shaped spring members resiliently supporting the lower cross member on the upper cross member, said spring members being spaced apart along said cross members, each U-shaped spring member comprising a curved central portion extending between parallel first and second leg portions;
   upper mounting elements each connecting the first leg portion of a respective one of the spring members to the upper cross member;
   lower mounting elements each connecting the second leg portion of a respective one of the spring members to the lower cross member; and
   a plurality of disk members supported on and spaced along the lower cross member, each disk member being arranged to engage the ground surface;
   the central portion of each U-shaped spring member having a circular cross section;
   the first leg portion of each U-shaped spring member having a first generally flat surface facing the second leg portion of said U-shaped spring member and a second generally flat surface opposite said first generally flat surface;
   the second leg portion of each U-shaped spring member having a first generally flat surface facing the first leg portion of said U-shaped spring member and a second generally flat surface opposite said first generally flat surface; and
   the U-shaped spring members being arranged such that the central portions of each spring member extend generally vertically and are disposed forward of the upper and lower cross members and the first and second leg portions of said spring member extend generally horizontally rearward from said central portion.

2. The disk harrow according to claim 1 wherein the first and second generally flat surfaces of each leg portion of each spring member are spaced apart by a respective distance, said respective distance being less than a diameter of the circular cross section of the central portion of said spring member.

3. The disk harrow according to claim 1 wherein the U-shaped spring members are arranged such that the first and second leg portions of each spring member extend generally perpendicular to the upper and lower cross members.

4. The disk harrow according to claim 1 wherein each upper mounting element comprises a first mounting member disposed above the upper cross member and a second mounting member disposed below said upper cross member, said first and second mounting members being attached so as to clamp said upper cross member therebetween.

5. The disk harrow according to claim 4 wherein there are provided pairs of aligned holes in the first and second mounting members of each upper mounting element for attachment of said mounting members by bolting.

6. The disk harrow according to claim 5 wherein the pairs of aligned holes in the first and second mounting members of each upper mounting element are disposed on opposite sides of the upper cross member.

7. The disk harrow according to claim 5 wherein there is provided at least one hole in the first leg portion of each U-shaped spring member, at least one of the pairs of aligned holes in the first and second mounting members of each upper mounting element aligning with the at least one hole in the first leg portion of the respective spring member for attachment of said upper mounting element and said respective spring member by bolting.

8. The disk harrow according to claim 4 wherein the first mounting member of each upper mounting element comprises a generally flat plate.

9. The disk harrow according to claim 4 wherein the second mounting member of each upper mounting element comprises a block having at least one recessed portion arranged to receive a portion of at least one of the upper cross member and the first leg portion of the respective spring member.

10. The disk harrow according to claim 1 wherein each lower mounting element comprises a first mounting member supported on the lower cross member and a second mounting member disposed above said first mounting member, said first and second mounting members of the lower mounting element being attached so as to clamp the second leg portion of the respective spring member therebetween.

11. The disk harrow according to claim 10 wherein the first mounting member of each lower mounting element is supported above the lower cross member such that the second leg portion of the respective spring member is immediately adjacent each of the first and second mounting members of said lower mounting element above said lower cross member.

12. The disk harrow according to claim 10 wherein the second mounting member of each lower mounting element comprises a generally flat plate.

13. The disk harrow according to claim 10 wherein the first mounting member of each lower mounting element comprises an angled member having a generally vertical portion extending upward from the lower cross member and a generally horizontal portion supported on said generally vertical portion upward of said lower cross member, the second leg portion of the respective spring member being clamped between said generally horizontal portion of said first mounting member and the second mounting member of said lower mounting element.

14. The disk harrow according to claim 10 wherein there are provided pairs of aligned holes in the first and second mounting members of each lower mounting element for attachment of said mounting members by bolting.

15. The disk harrow according to claim 14 wherein the pairs of aligned holes in the first and second mounting members of each lower mounting element are disposed on opposite sides of the lower cross member.

16. The disk harrow according to claim 14 wherein there is provided at least one hole in the second leg portion of each U-shaped spring member, at least one of the pairs of aligned holes in the first and second mounting members of each lower mounting element aligning with the at least one hole in the second leg portion of the respective spring member for attachment of said lower mounting element and said respective spring member by bolting.

17. The disk harrow according to claim 1 wherein the lower cross member comprises a shaft adapted for rotation about an axis thereof, said shaft being supported by the lower mounting elements connected to the second leg portions of the spring members, the disk members being supported on said shaft for rotation therewith.

18. The disk harrow according to claim 17 wherein the lower cross member further comprises at least one hollow housing member extending between adjacent disk members, the shaft being supported for rotation within said at least one housing member, said at least one housing member having the lower mounting elements attached thereto.

19. A disk harrow comprising:
   a frame adapted for motion along a ground surface, said frame comprising an upper cross member supported generally horizontally;
   a shaft supported below the first cross member, said shaft adapted for rotation about a longitudinal axis thereof and extending generally parallel to said first cross member;
   a plurality of disk members supported on and spaced along the shaft, each disk member being arranged to engage the ground surface and rotate with said shaft;
   U-shaped spring members resiliently supporting the shaft on the upper cross member, said spring members being spaced apart along said cross members, each U-shaped spring member comprising a curved central portion extending between parallel first and second leg portions;
   upper mounting elements each connecting the first leg portion of a respective one of the spring members to the upper cross member; and
   lower mounting elements each connecting the second leg portion of a respective one of the spring members to the shaft;
   the central portion of each U-shaped spring member having a circular cross section;
   the first leg portion of each U-shaped spring member having a first generally flat surface facing the second leg portion of said U-shaped spring member and a second generally flat surface opposite said first generally flat surface;
   the second leg portion of each U-shaped spring member having a first generally flat surface facing the first leg portion of said U-shaped spring member and a second generally flat surface opposite said first generally flat surface; and
   the U-shaped spring members being arranged such that the central portions of each spring member extend generally vertically and are disposed forward of the upper and lower cross members and the first and second leg portions of said spring member extend generally horizontally rearward from said central portion.

20. The disk harrow according to claim 19 wherein the first and second generally flat surfaces of each leg portion of each spring member are spaced apart by a distance, said distance being less than a diameter of the circular cross section of the central portion of said spring member.

* * * * *